(12) United States Patent
Loftus et al.

(10) Patent No.: US 10,534,527 B2
(45) Date of Patent: Jan. 14, 2020

(54) RELATIVE PEN SCROLL

(71) Applicant: Wacom Co., Ltd., Kazo-shi, Saitama (JP)

(72) Inventors: Kenton J. Loftus, Vancouver, WA (US); Robert C. Cohn, Beaverton, OR (US)

(73) Assignee: Wacom Co., Ltd., Kazo-shi (JP)

( * ) Notice: Subject to any disclaimer, the term of this patent is extended or adjusted under 35 U.S.C. 154(b) by 48 days.

(21) Appl. No.: 15/870,093

(22) Filed: Jan. 12, 2018

(65) Prior Publication Data

US 2019/0220161 A1 Jul. 18, 2019

(51) Int. Cl.

| G06F 3/0485 | (2013.01) |
|---|---|
| G06F 3/0354 | (2013.01) |
| A63F 13/2145 | (2014.01) |
| A63F 13/24 | (2014.01) |
| A63F 13/428 | (2014.01) |
| A63F 13/218 | (2014.01) |
| G06F 3/0484 | (2013.01) |

(52) U.S. Cl.
CPC .......... *G06F 3/0485* (2013.01); *A63F 13/218* (2014.09); *A63F 13/2145* (2014.09); *A63F 13/24* (2014.09); *A63F 13/428* (2014.09); *G06F 3/03545* (2013.01); *G06F 3/04845* (2013.01); *G06F 2203/04806* (2013.01)

(58) Field of Classification Search
USPC .......................................................... 463/37
See application file for complete search history.

(56) References Cited

U.S. PATENT DOCUMENTS

| 2004/0190011 A1* | 9/2004 | Walker, Jr. ............ G06F 17/212 |
|---|---|---|
| | | 358/1.2 |
| 2014/0101577 A1* | 4/2014 | Kwak ................... G06F 1/1618 |
| | | 715/761 |
| 2016/0274686 A1* | 9/2016 | Alonso Ruiz ....... G06F 3/03547 |
| 2016/0342574 A1* | 11/2016 | Zhang ..................... G06F 17/22 |
| 2018/0314680 A1* | 11/2018 | Dorai .................. G06F 17/2288 |

\* cited by examiner

*Primary Examiner* — Pierre E Elisca

(74) *Attorney, Agent, or Firm* — Christensen O'Connor Johnson Kindness PLLC

(57) ABSTRACT

A computing device (e.g., a host computer in communication with a tablet input device) receives pen data corresponding to first and second positions of a pen device. The computing device compares the first and second positions to obtain an angle and an offset distance between the positions. The computing device selects a scrolling direction (either vertical or horizontal) based on the angle, with the selection being biased towards vertical scrolling. The computing device determines a number of scrolling events based on the offset distance, which may include comparing the offset distance with a preselected minimum distance. The computing device sends the scrolling events to an application executing on the computing device. The scrolling events cause the application to render scrolling in the selected scrolling direction. The pen data may include an indication of pen-down status and/or pen button activation to help determine whether to activate or terminate scrolling.

20 Claims, 7 Drawing Sheets

RELATIVE PEN SCROLL

BACKGROUND

In recent years, electronic documents have become ubiquitous. At the same time, the number and variety of devices and tools for viewing electronic documents have been continually increasing.

In one familiar scenario, a user views a document or web page that cannot be displayed all at once on the screen, and scrolls down through the document to view the previously hidden part of the document. For example, a user of a desktop computer may click a mouse button or manipulate a scroll wheel to scroll the document. Some applications, such as the Firefox® browser available from the Mozilla Foundation, also permit automatic scrolling using a scroll wheel button of a mouse, which is activated by pressing down on the top of the scroll wheel. In this scenario, a user clicks on the mouse wheel button at an initial location on a page and then moves the mouse cursor to initiate automatic scrolling in the direction of the movement of the mouse cursor. A small movement of the mouse cursor from the location of the mouse-wheel-button click causes slower scrolling, and a larger movement causes faster scrolling. On a page where both vertical scrolling and horizontal scrolling are available, this mouse-wheel-button scrolling technique can be very difficult to control. The scrolling direction may shift from a vertical scrolling direction (up or down), to various degrees of diagonal scrolling, to a horizontal scrolling direction (left or right) with corresponding movements of the mouse. This leads to a very unnatural viewing experience.

Furthermore, the act of viewing documents or web pages on a desktop computer with a mouse is becoming less common as users move to more intuitive computing devices with smaller screens, such as tablet input devices, that use touchscreens or electronic pens for input. In addition, the smaller screen areas of such devices lead to more situations in which a document or page may be scrolled both vertically and horizontally.

Therefore, there is a need for improved methods to provide precise and intuitive scrolling control on such devices.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a computing device communicatively coupled to a tablet input device receives pen data corresponding to a first pen event at a first position of a pen device detected by the tablet input device and a second pen event at a second position of the pen device. The computing device performs a comparison of the first position and the second position to obtain an angle of the second position relative to the first position, and an offset distance between the second position and the first position. The computing device selects a scrolling direction based at least in part on the angle. The selected scrolling direction is either a vertical direction or a horizontal direction, with the selection being biased towards vertical scrolling. The computing device determines a number of scrolling events based at least in part on the offset distance, which may include comparing the offset distance with a preselected minimum distance. The computing device sends the scrolling events to an application executing on the computing device, and the scrolling events cause the application to render scrolling in the selected scrolling direction.

The first and second positions each include a vertical component and a horizontal component. Selection of the scrolling direction may include calculating delta Y as the difference between the vertical components, and calculating delta X as the difference between the horizontal components. The computing device may select vertical scrolling if the absolute value of delta Y is greater than or equal to the absolute value of delta X times a slope value, or otherwise select horizontal scrolling.

The computing device may, in further operation, receive third pen data corresponding to a third pen event, determine whether to continue scrolling in the selected scrolling direction based at least in part on the third pen event, determine a number of additional scrolling events based at least in part on the third pen event, and send the additional scrolling events to the application. This allows the direction or rate of scrolling to be adjusted by further movements of the pen. In such a scenario, if the third pen event is at a third position of the pen device that differs from the second position, then determining whether to continue scrolling in the selected scrolling direction may include determining an updated angle based at least in part on the third position, and determining the number of additional scrolling events may include determining an updated offset distance based at least in part on the third position. If the third pen event is at the same position as the second position, scrolling may continue in the same direction at the previously determined rate, that is, with the number of additional scrolling events sent to the application being the same as the first number of scrolling events.

Control of functionality other than scrolling also is contemplated. In one aspect, a computing device receives pen data corresponding to pen events at first and second positions of a pen device, performs a comparison of the first position and the second position to obtain an offset distance between the second position and the first position, determines a number of transformation events (zoom events or rotation events) based at least in part on the offset distance, and sends the transformation events to an application executing on the computing device to cause the application to render a corresponding transformation (zoom or rotation) for display.

In another aspect, a computing device receives pen data corresponding to first and second pen events that include pen angle values (e.g., azimuth, altitude, and/or rotation). The computing device performs a comparison of the first pen angle value and the second pen angle value to obtain a pen angle delta between the second pen angle value and the first pen angle value. The computing device determines an application control event (e.g., a game control event analogous to joystick control) based at least in part on the size of the pen angle delta, and sends the application control event to an application (e.g., a game) executing on the computing device. The application control event is configured to control at least part of the functionality of the application.

In an illustrative scenario, the computing device is a host computer, and the steps are performed by a tablet input device driver executing on the host computer. The pen data may include an indication of pen-down status and/or pen button activation to help determine whether to activate or terminate scrolling or other transformation events.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In the following description, numerous specific details are set forth in order to provide a thorough understanding of illustrative embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

I. Introduction

In embodiments described herein, a computer system provides enhanced control of applications (e.g., scrolling functionality) via pen input. In an illustrative scenario, a user moves an electronic pen on the surface of a tablet input device to precisely control speed and direction of scrolling functionality to view content in an application such as a web browser or document viewer. The user can select a scrolling rate that is comfortable and adjustable. For example, a larger movement from an initial pen-down point can be used to request a faster scrolling speed, and a smaller movement can be used to request a slower scrolling speed. When a desired scrolling speed is achieved, the user can keep the pen in the same position on the surface of the tablet to maintain the same scrolling speed, allowing the user to focus on viewing the content. Or the user can continue movement of the pen to speed up or slow down the scrolling speed. The amount of movement required to achieve a particular scrolling speed can be adjusted by a user to allow for finely tuned control. Described embodiments also provide intuitive control of scrolling direction to avoid the chaotic "all-direction" drift effect of scrolling in prior systems.

II. Illustrative Systems and Devices

Figure 1A:
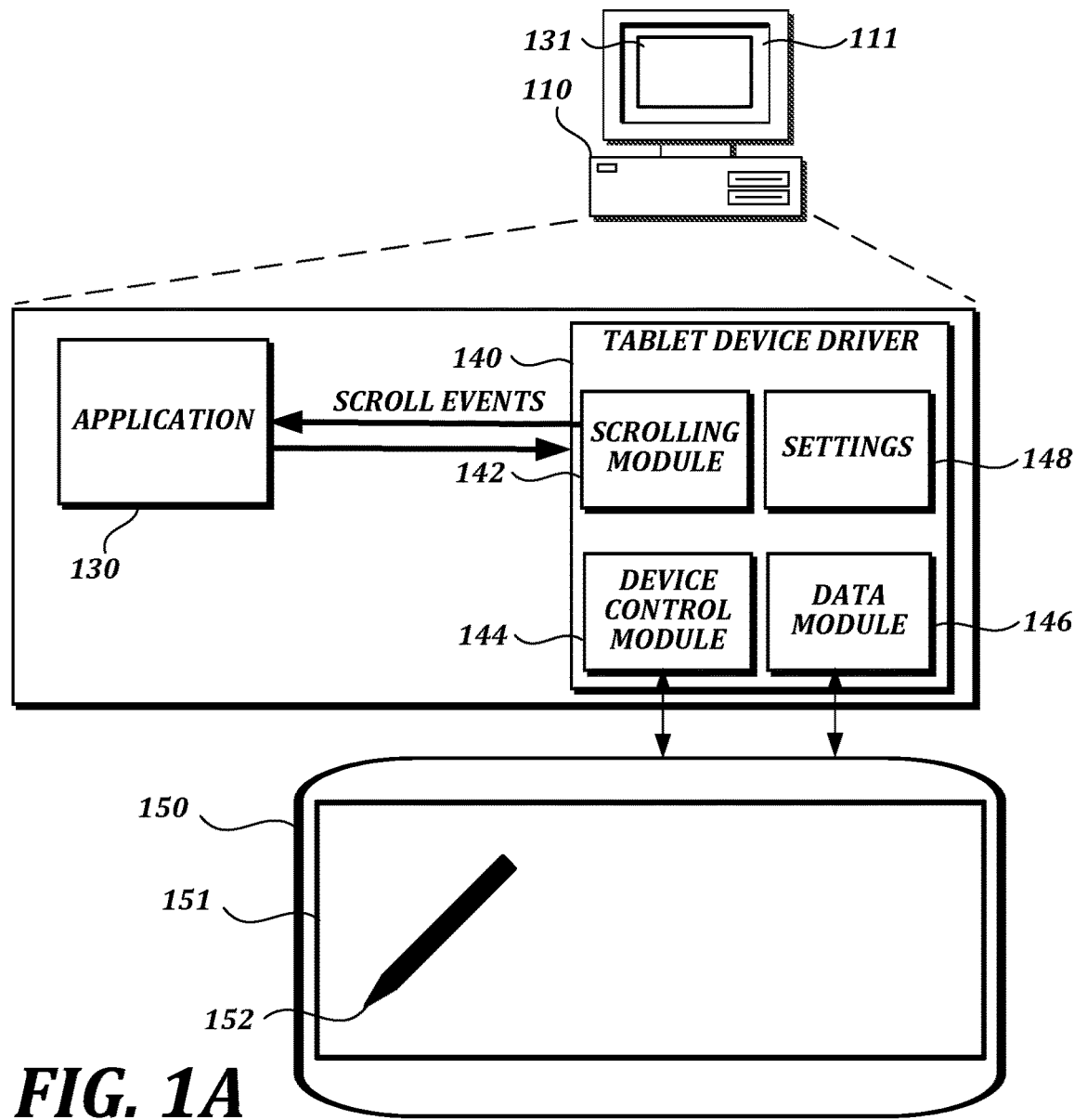
FIG. 1A is a diagram of an illustrative system in which described embodiments may be implemented.

FIG. 1A is a block diagram of an illustrative system in which described embodiments may be implemented. In the example shown in FIG. 1A, a host computer 110 executing an application 130 communicates with and controls a tablet input device 150 via a tablet input device driver 140. The tablet input device 150 and driver 140 are configured to allow a user to interact with (e.g., via scrolling functionality described herein) the application 130. The tablet input device driver 140 includes a control module 144 and a data module 146. The tablet input device driver 140 can be launched at computer start-up time (e.g., before the application 130 is launched), or at some other time.

In the example shown in FIG. 1A, the host computer 110 provides a graphical user interface 111 with a user interface element 131 (e.g., an application-specific window) for interacting with the application 130. The control module 144 controls the tablet input device 150 and the data module 146 receives data from the tablet input device. Data received by the data module 146 includes pen event data (e.g., coordinate data, pressure data, pen-down data, pen button data) that corresponds to input from a pen device 152. Data received by the data module 146 also may include data other than pen event data, such as biometric data or device identification data. The content of the pen event data may depend on the configuration or capabilities of the tablet input device or pen device. For example, if the tablet input device or pen device lacks a pressure sensor, pressure data may be omitted.

In this example, the tablet input device (e.g., a Cintiq™ tablet available from Wacom Co., Ltd.) includes a display 151 (e.g., an LCD screen) that displays an electronic document, image, illustration, model, or other content that can be scrolled. (This type of input device also can be referred to as a "display" tablet device.) Alternatively, the tablet input device may provide input functionality but omit a display (e.g., an Intuos™ tablet available from Wacom Co., Ltd.). (This type of input device also can be referred to as an "opaque" tablet device.) Pen data can be provided as input to the data module 146 and to scrolling control module 148 for controlling scrolling functionality or other transformations or application control functionality, as described in further detail below. Scrolling control module 148 also may store rules, preferences, or other settings that can be used to adjust the described functionality for particular users or applications. Scrolling or other transformations, as described in further detail below, can be rendered on the tablet input device itself, on a host computer, or a combination of devices.

In an illustrative scenario, the application 130 is a web browser, and the host computer 110 communicates with a remote web server (not shown) over a network, such as the Internet, via the web browser. The web browser renders a page that can be viewed with scrolling functionality described herein.

In general, signature devices may use electromagnetic resonance (EMR) technology, in which a digitizer incorporates a sensor board that detects the pen's movement and energy is induced in the pen's resonant circuit by a magnetic field generated by the sensor board surface. The pen's resonant circuit then makes use of this energy to return a magnetic signal to the sensor board surface. The board detects the pen's coordinate position at regular time intervals even if the electronic pen does not touch the sensor board surface, so long as the pen remains within close enough proximity to the sensor board, such that signals can still be received from the pen. (The effective signal range can vary depending on the particular technology being used, but is generally on the order of several millimeters.)

Alternatively, other input technology can be used. For example, an electronic pen may use other wireless technology or may be connected by a wire to a digitizer. As another example, an electronic pen may or may not be detectable away from the surface of a digitizer. As another example, an electronic pen may be powered or unpowered. Powered pens may receive power via a wire connected to an external power source or via an on-board battery. As another example, it is possible to receive input data via a stylus on a pressure sensitive digital writing pad. As another example, it is possible to receive input data without an electronic pen (e.g., via touch input on a touchscreen).

Figure 1B:
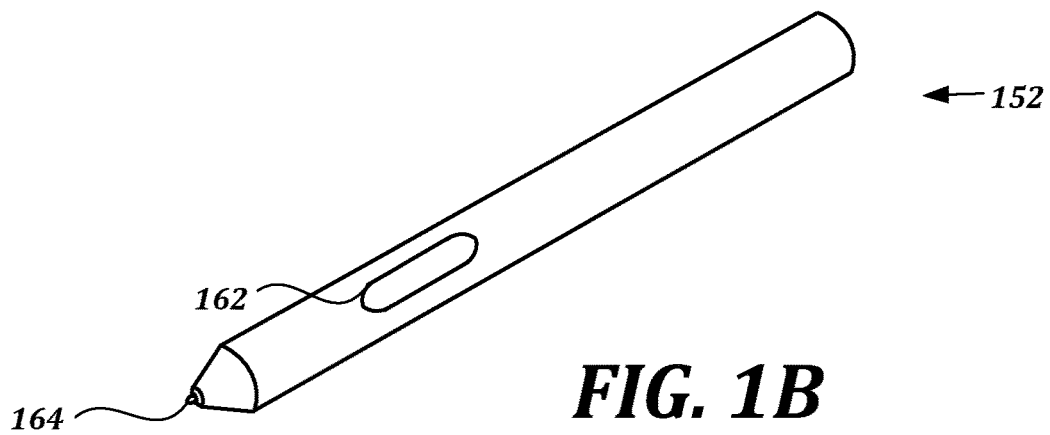
FIG. 1B depicts an illustrative electronic pen that may be used in described embodiments.

FIG. 1B is a diagram of an illustrative electronic pen 152 that may be used in described embodiments. The pen 152 uses EMR technology described above and also includes one or more buttons and a nib or pen point. In the example shown in FIG. 1B, a nib 164 and related EMR circuitry within the pen 152 allows for input of precise positioning data by the tablet input device 150. As an option, the nib 164 may be pressure sensitive to allow for collection of pressure information, but this is not required. Functionality of the button 162 can be programmed in different ways depending on the application being used. In some examples described herein, the pen button is used to indicate that a control gesture, such as a scrolling control gesture, is in progress. The activation of the pen button therefore provides an indication of how the pen input data should be interpreted. Alternatively, other pen configurations can be used.

However the input data may be collected, input data may include pen event information, device information, and/or other information such as contextual information about the context in which the input is being provided (type of document, user account information, etc.). Pen event information may include the x/y position of the pen-tip on or above the digitizer surface and the time since the start of the handwriting. In addition to x/y-coordinate values, pen event information may optionally include additional information subject to the capabilities of the signature device, such as pressure (pen force), pen angles (azimuth, altitude, and/or rotation), pen button status, and pen-down status. Pen event information is typically collected at regular intervals during use. The rate or frequency at which pen data samples are collected (sample rate) can vary depending on factors such as device capabilities and user preferences.

III. Illustrative Processes and Workflows

Figure 2:
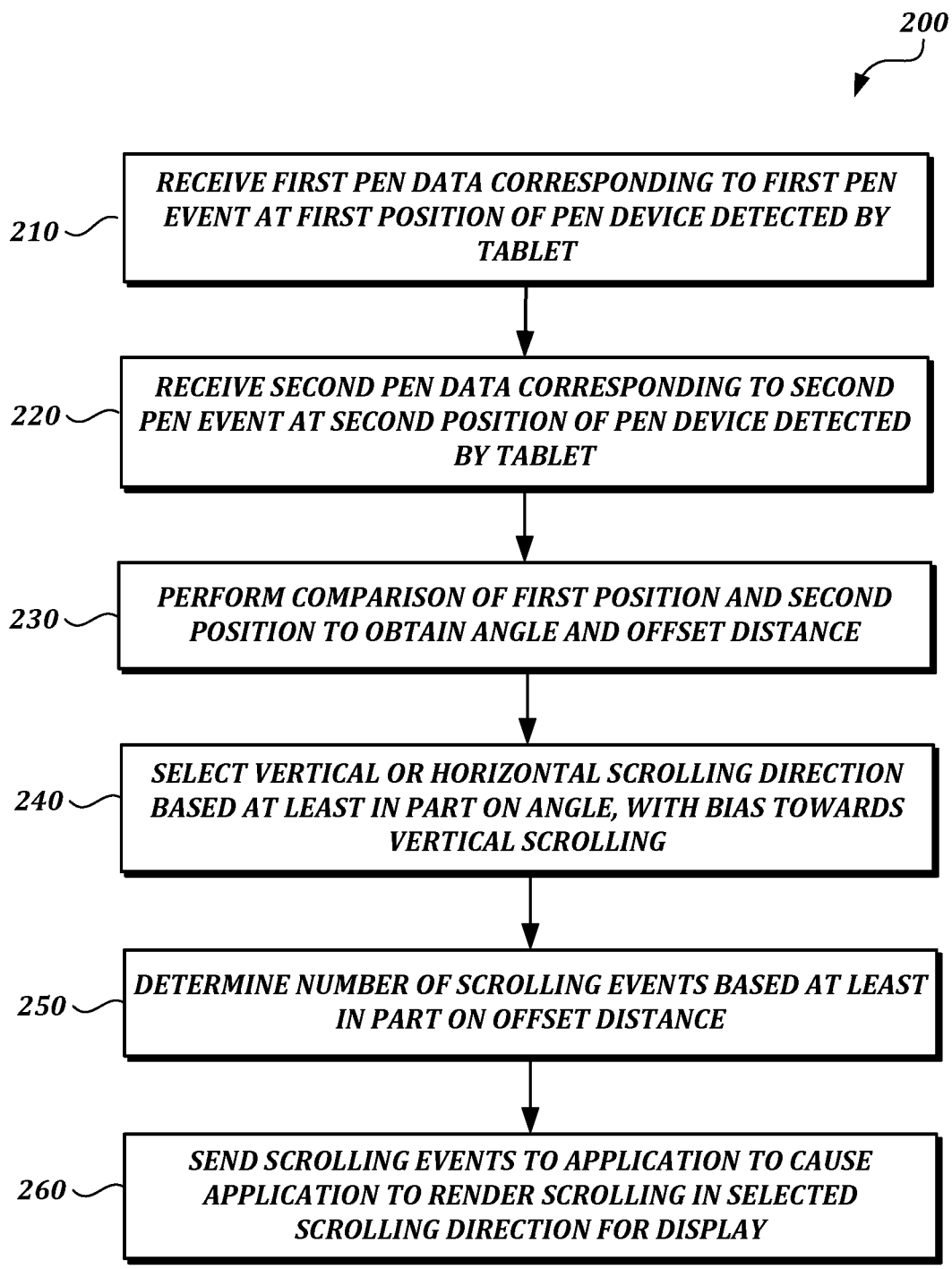
FIG. 2 is a flow diagram of an illustrative process that may be implemented by the system of FIG. 1A, according to an embodiment of the present disclosure.
Figure 3A:
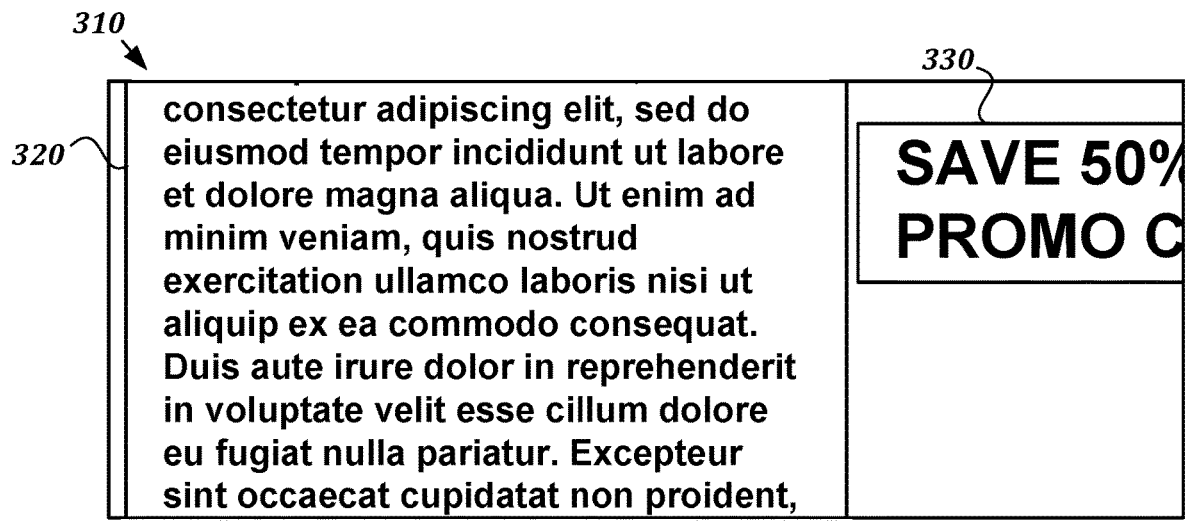
FIGS. 3A-3D are diagrams of an illustrative scrolling direction selection process that is biased towards vertical scrolling according to an embodiment of the present disclosure.
Figure 3B:
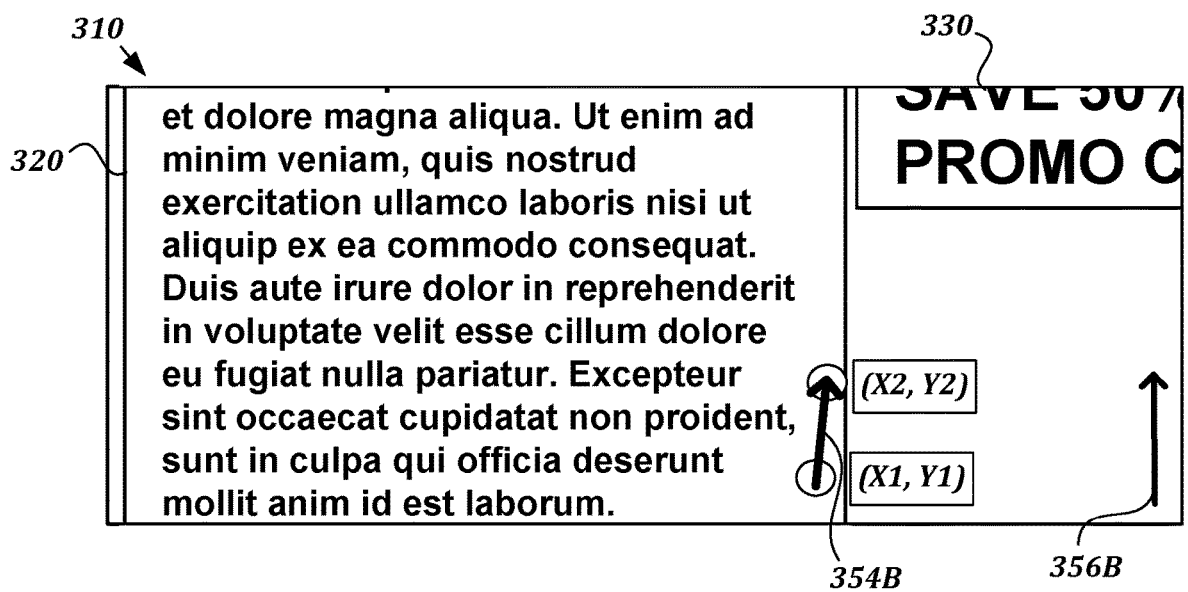
Figure 3C:
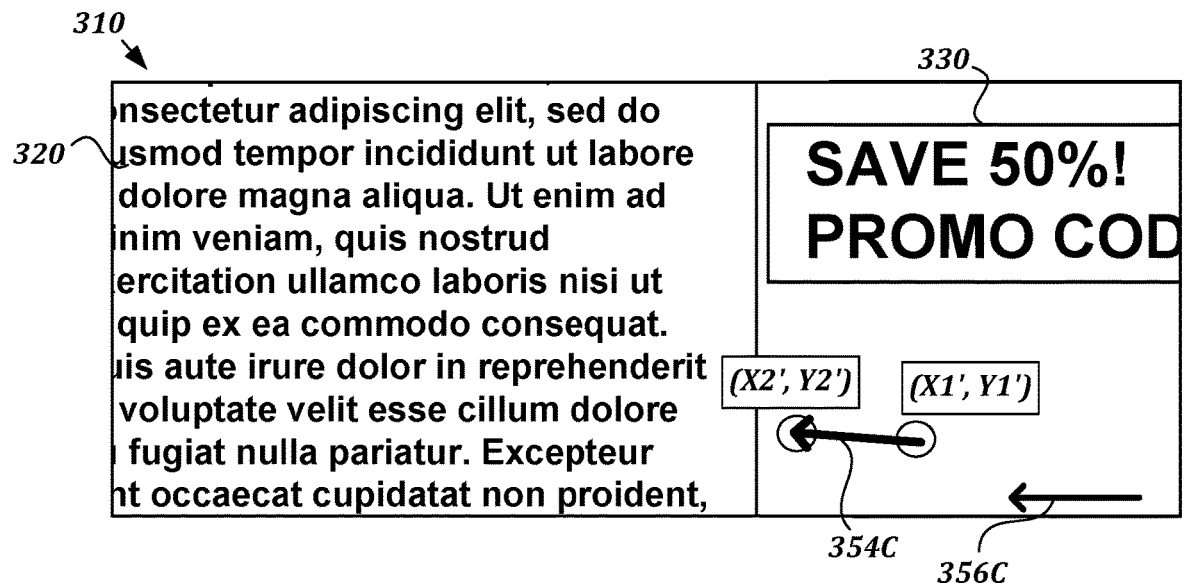
Figure 3D:
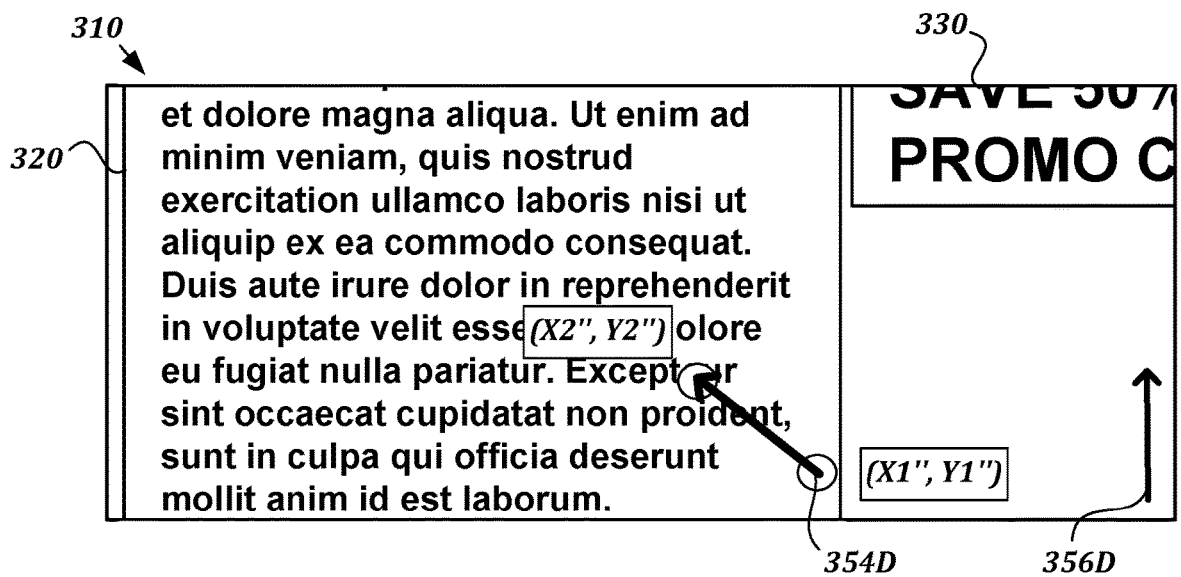

FIG. 2 is a flow diagram of an illustrative process 200 that may be implemented by the system shown in FIG. 1A, or some other computer system that receives pen input and handles scrolling functionality for applications. In the example shown in FIG. 2, at step 210 the system receives first pen data corresponding to a first pen event at a first position of the pen, as detected by a tablet input device. The tablet input device may be, for example, an opaque tablet device or a display tablet device. At step 220, the system receives second pen data corresponding to a second pen event at a second position of the pen, as detected by the tablet input device. At step 230, the system performs a comparison of the first position and the second position in order to obtain an angle (e.g., the angle of the diagonal line between the two positions) and an offset distance between the two positions. At step 240, the system selects either vertical scrolling (up or down) or a horizontal scrolling (left or right) based at least in part on the angle. In embodiments described in further detail below, the particular direction (e.g., up or down for vertical scrolling, left or right for horizontal scrolling) is further based on the relative positions (positive or negative deltas) between pen events. The restriction to vertical or horizontal scrolling avoids situations where a diagonal pen movement, if interpreted too literally, may otherwise indicate diagonal scrolling, which is unlikely to fit with the user's actual intention. In addition, in order to allow for more intuitive operation, this selection step is biased towards vertical scrolling, which is more common than horizontal scrolling when viewing documents.

FIGS. 3A-3D are diagrams of an illustrative scrolling direction selection process that is biased towards vertical scrolling. In these diagrams, a browser 310 displays a web page including text content 320 that requires vertical scrolling to be viewed completely and an advertisement 330 that requires horizontal to be viewed completely. Starting from an initial state depicted in FIG. 3A, the selected scrolling results in the states depicted in FIGS. 3B-3D. In the example shown in FIG. 3B, the system compares a first pen position (X1, Y1) with second pen position (X2, Y2) sampled at a later point in time to determine whether vertical or horizontal scrolling should be performed. As shown, the diagonal line 354B between these two positions is nearly vertical, and the system selects vertical scrolling (in this case, scrolling up), indicated by arrow 356B. In the example shown in FIG. 3C, the diagonal line 354C between the first pen position (X1', Y1') and the second pen position (X2', Y2') is nearly horizontal, and the system selects horizontal scrolling (in this case, scrolling left), indicated by arrow 356C. Finally, in the example shown in FIG. 3D, the diagonal line 354D between the first pen position (X1", Y1") and the second pen position (X2", Y2") is somewhat closer to horizontal than vertical. Here, where the line between the two pen positions is at an angle that is closer to horizontal than vertical, but still includes a substantial vertical component, the system employs a bias in favor of vertical scrolling and selects vertical scrolling (scrolling up at a rate similar to FIG. 3B), indicated by arrow 356D. As noted above, the particular direction (e.g., up or down for vertical scrolling, left or right for horizontal scrolling) may be further based on the relative positions (positive or negative deltas) between pen events, as described in further detail below. An illustrative scrolling direction selection process is described in more detail below with reference to FIG. 4.

Referring again to FIG. 2, after the angle and offset distance are obtained, at step 250 the system determines a number of scrolling events (e.g., corresponding to scrolling of a number of text lines, pixel lines, pages, or some other unit) based at least in part on the offset distance. This allows the user to control the speed of scrolling by adjusting her pen position to a larger or smaller offset distance from the original point, as appropriate. At step 260, the system sends scrolling events to an application (e.g., a browser or document reader executing on a host computing device) to cause the application to render scrolling in the selected scrolling direction for display (e.g., on a display of the host computing device, a display of a tablet computing device that includes the input device, on some other display).

Figure 4:
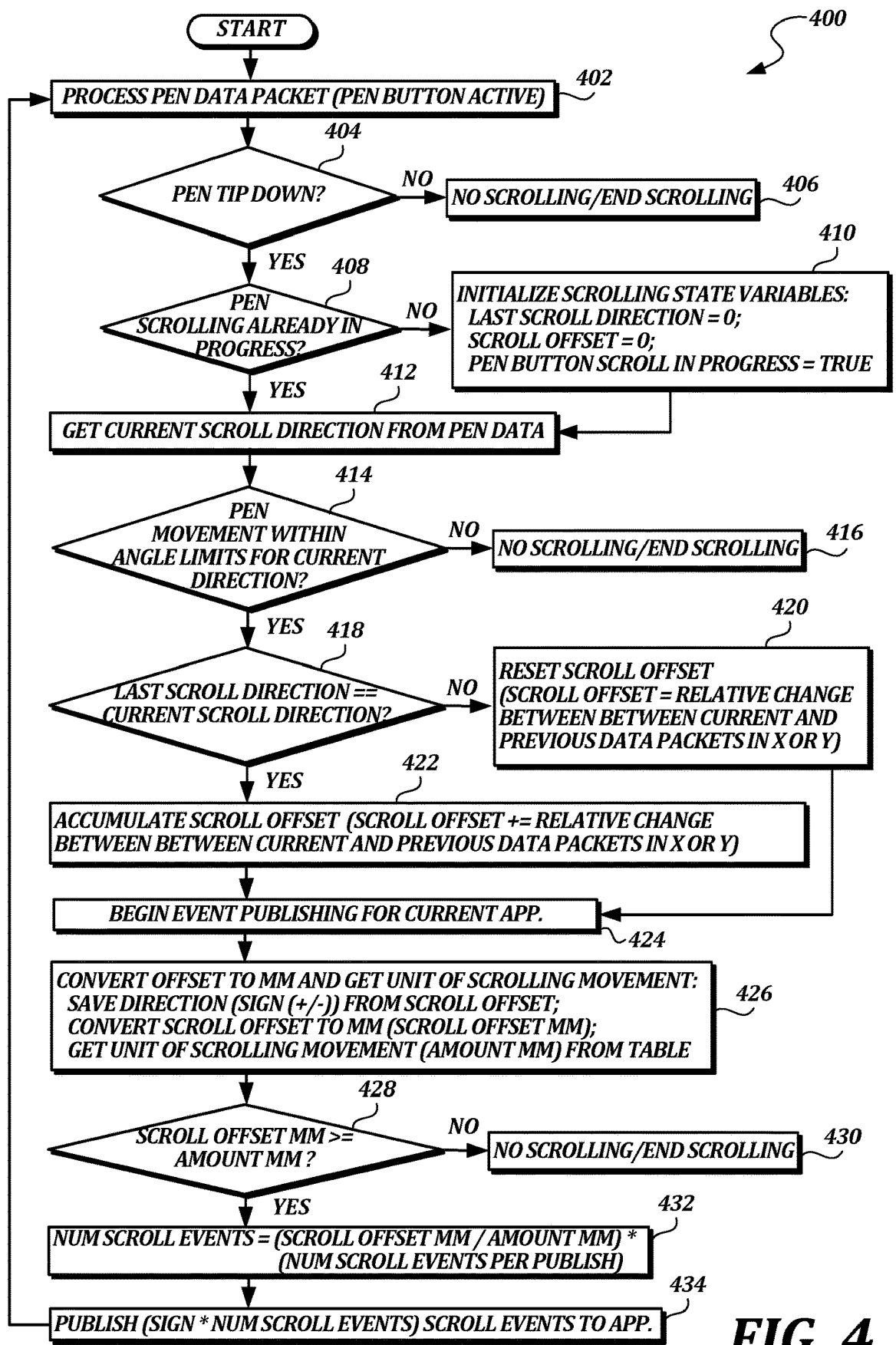
FIG. 4 is a flow diagram of an illustrative process that may be implemented by the system of FIG. 1A, according to an embodiment of the present disclosure.

FIG. 4 is a flow diagram of an illustrative, detailed process 400 that may be implemented by a system such as the system shown in FIG. 1A. In the example shown in FIG. 4, illustrative approaches are described that relate to steps illustrated in the process 200 of FIG. 2, such as selection of a scrolling direction, calculating offset distance, and calculating a number of scroll events to provide to an application.

At step 402, the system begins the process of processing a pen data packet received from an input device, such as an opaque tablet device or a display tablet device. In this example, this process is initiated upon activation of a pen button (e.g., button 162 depicted in FIG. 1B) in an appropriate context (e.g., when a scrollable document, page, image, or the like is being viewed in an application). At step 404 the system determines whether the pen tip is down. For example, the system can receive an indication from a tablet input device that the input device is receiving signals from the pen. As another example, if the pen or tablet includes a pressure sensor, the pen-down indication may be based on whether a pressure value is greater than zero. If the pen tip is not down, the process ends at step 406.

If the pen tip is down, the system determines whether scrolling is already in progress at step 408. (This in-progress state can be referred to as a down-hover state.) If no scrolling is in progress, state variables (Last Scroll Direction, Scroll Offset, Scroll In Progress) are initialized at step 410. Scroll Offset is set to 0, with the current pen position acting as the origin or anchor point for calculating the offset distance. Last Scroll Direction is also set to 0, which represents an unknown direction that will be updated when the pen data is analyzed.

In either case, the process proceeds to step 412 to being the process of getting a current scroll direction based on the pen data received by the system. In this example, position (X, Y) data from a current pen data packet is compared with position data from a previous pen data packet to determine a delta X value and a delta Y value. The signs of the respective delta values indicate direction of pen movement, with a positive X value indicating rightward movement of the pen, a negative X value indicating leftward movement of the pen, a positive Y value indicating upward movement of the pen, and a negative Y value indicating downward movement of the pen. A combination of non-zero delta X and delta Y values indicates diagonal pen movement. However, in this example the direction of scrolling that is selected based on this pen movement is restricted to horizontal or vertical.

As explained above with reference to FIGS. 2 and 3A-3C, restriction of scrolling direction to horizontal and vertical scrolling can help to avoid situations where a diagonal pen movement may otherwise indicate diagonal scrolling, which is unlikely to fit with the user's actual intention. Therefore, at step 414 (FIG. 4) the system determines whether the pen movement is within acceptable angle limits for the current scrolling direction.

In at least one embodiment, the scrolling direction—vertical or horizontal—is determined by comparing the absolute value of the delta Y value to the absolute value of the delta X value as illustrated in the following pseudocode:
    if (absolute(deltaY)>=slope*absolute(deltaX))
    then movement is vertical scrolling
    else movement is horizontal scrolling.

In this example, if the slope value is ⅓, this means that it takes an X movement 3 times larger than the Y movement to indicate an X (horizontal) scrolling direction. The result of this particular value of slope favors Y (vertical) scrolling. A slope of 1 would give equal weight to movement in Y or X directions, but this would cause more inadvertent slipping into an undesired direction. Alternatively, in a situation where horizontal scrolling may be more common, the slope value could be greater than 1, providing a bias towards horizontal scrolling. Using slope is much simpler and faster than dealing with trigonometric functions to determine if a point is within a certain angle. For example, the example slope value of ⅓ corresponds to a vertical scrolling angle range of about 19 degrees to 161 degrees.

Angle ranges may be adjustable to allow for a variety of user preferences. For example, a user may be given an option to adjust the slope value, or to provide an angle range that can be converted to a slope value.

Referring again to FIG. 4, if the pen movement is not within angle limits for the current scrolling direction, the current scrolling ends at step 416. (A new scrolling direction may be selected based on further pen data.) Otherwise, the current scrolling direction (e.g., up or down for scrolling in the vertical dimension, left or right for scrolling in the horizontal dimension) is compared with the previous scrolling direction at step 418. If they are not the same (e.g., the current scrolling direction is up, and the previous scrolling direction was down), at step 420 the system resets the offset distance (Scroll Offset) to be the current delta X or delta Y value (depending on the current direction) between the pen positions in the current and previous data packets, with any previous offset distance from the previous scrolling direction being discarded. If the previous and current scrolling directions are the same, the offset distance is updated by adding the current delta X or delta Y value at step 422. Because the current delta X or delta Y value may be positive or negative or zero, depending on the movement of the user's pen between the time instances corresponding to the current and previous pen data packets, the offset distance may be increased, decreased, or remain the same in step 422.

With the offset distance now up to date, the process continues at step 424, where the system begins event publishing for an application. The application can choose to interpret such events in different ways. For example, an application can receive an event and interpret it as a scroll wheel event, allowing the user to emulate the effect of a scroll wheel with the pen input. The overall sign of Scroll Offset (positive or negative) indicates the scrolling direction (up or down for vertical scrolling, left or right for horizontal scrolling). At step 426, the system normalizes the offset distance by converting it to millimeters (Scroll Offset MM) to represent how far the user has moved the pen tip. This calculation is based on a calibrated tablet resolution. The system also obtains a predefined minimum amount for scrolling movement (Amount MM) to prepare for calculating a number of scrolling events in later steps. In this example, the value of Amount MM is adjustable by a user and represents the amount of pen movement required to cause a scrolling event. This provides a mechanism for controlling scrolling speed, with smaller values translating to faster scrolling speeds. Amount MM may be stored in a table that can be accessed by the system. The direction sign of Scroll Offset is saved in order to preserve this record of the scrolling direction.

At step 428, the system determines whether Scroll Offset MM is greater than or equal to Amount MM. If not, the current scrolling ends at step 430. Otherwise, the system calculates a number of scrolling events at step 432 by dividing Scroll Offset MM by Amount MM and publishes these events to the application at step 434, with direction (up or down for vertical scrolling, left or right for horizontal scrolling) indicated by the sign. (Optionally, the number of scrolling events to be published can be adjusted by multiplying by a scaling factor (Num Scroll Events Per Publish)). The application renders the scrolling (e.g., for display on a host computer or tablet device) based on the number of scrolling events that are published to the application. The process can then return to step 402 to process the next data packet if more are available.

As an example, if Scroll Offset MM is 25 mm and Amount MM is 10 mm, 2 scrolling events are published. If Scroll Offset MM is 7 rather than 25, no scrolling event is published because the offset is less than the predefined minimum amount. Thus, larger offset distances result in more scrolling events, and therefore, faster scrolling.

IV. Extensions and Alternatives

Many alternatives to the processes shown in FIGS. 2 and 4 are possible. As one alternative, the algorithm can be modified to favor horizontal scrolling, rather than vertical scrolling, a particular direction of horizontal or vertical scrolling (e.g., up, down, left, or right), or some other direction or type of scrolling.

Figure 5:
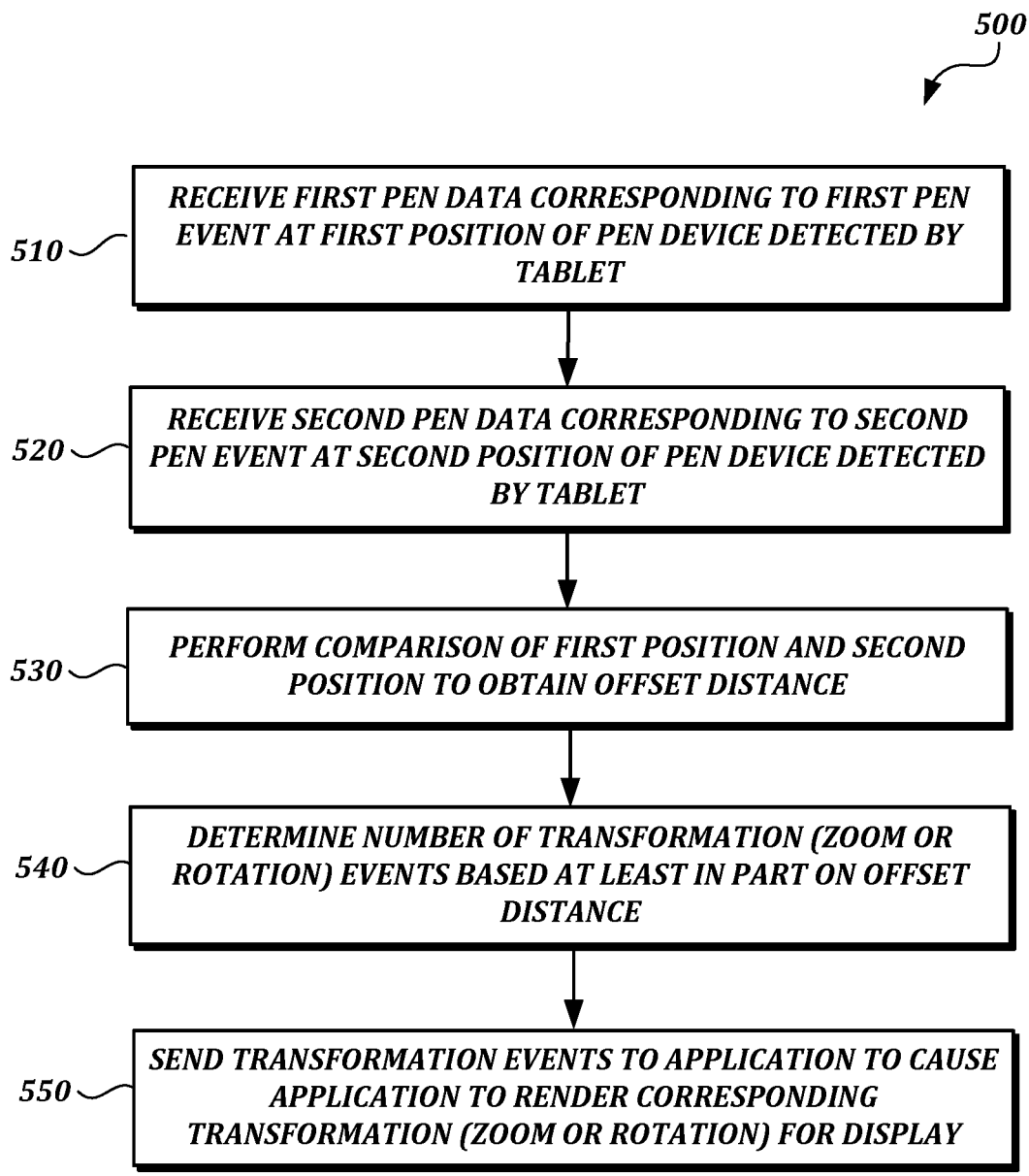
FIGS. 5 and 6 are flow diagrams of additional illustrative processes according to additional embodiments of the present disclosure.

As another alternative, these processes can be modified and/or extended to account for different types of transformation other than scrolling (e.g., zoom operations, 2D rotation operations, or 3D rotation (tumble) operations) can be controlled in a similar way, with zoom or rotation events being calculated and published in lieu of scrolling events. For example, FIG. 5 is a flow diagram of an illustrative process 500 in which zoom or rotation events are published to an application. In the example shown in FIG. 5, at step 510 the system receives first pen data corresponding to a first pen event at a first position of the pen, as detected by an input device. At step 520, the system receives second pen data corresponding to a second pen event at a second position of the pen, as detected by the input device. At step 530, the system performs a comparison of the first position and the second position in order to obtain an offset distance (and optionally an angle) between the two positions. At step 540, the system determines a number of transformation events (e.g., zoom or rotation events) based at least in part on the offset distance. This allows the user to control the speed of the transformation (e.g., zooming in or out, or rotation) by adjusting her pen position to a larger or smaller offset distance from the original point, as appropriate. At step 550, the system sends the transformation events to an application (e.g., a browser, image viewer, map or navigation application, 3D modeling application, or the like executing on a host computing device) to cause the application to render the transformation for display (e.g., on a display of the host computing device, a display of a tablet computing device that includes the input device, on some other display). In an illustrative scenario, a 3D modeling application, illustration application, or image processing application may use such techniques to allow users to efficiently and quickly perform object or image rotations or other transformations that may otherwise require complicated keystroke combinations or selections of menu items.

Figure 6:
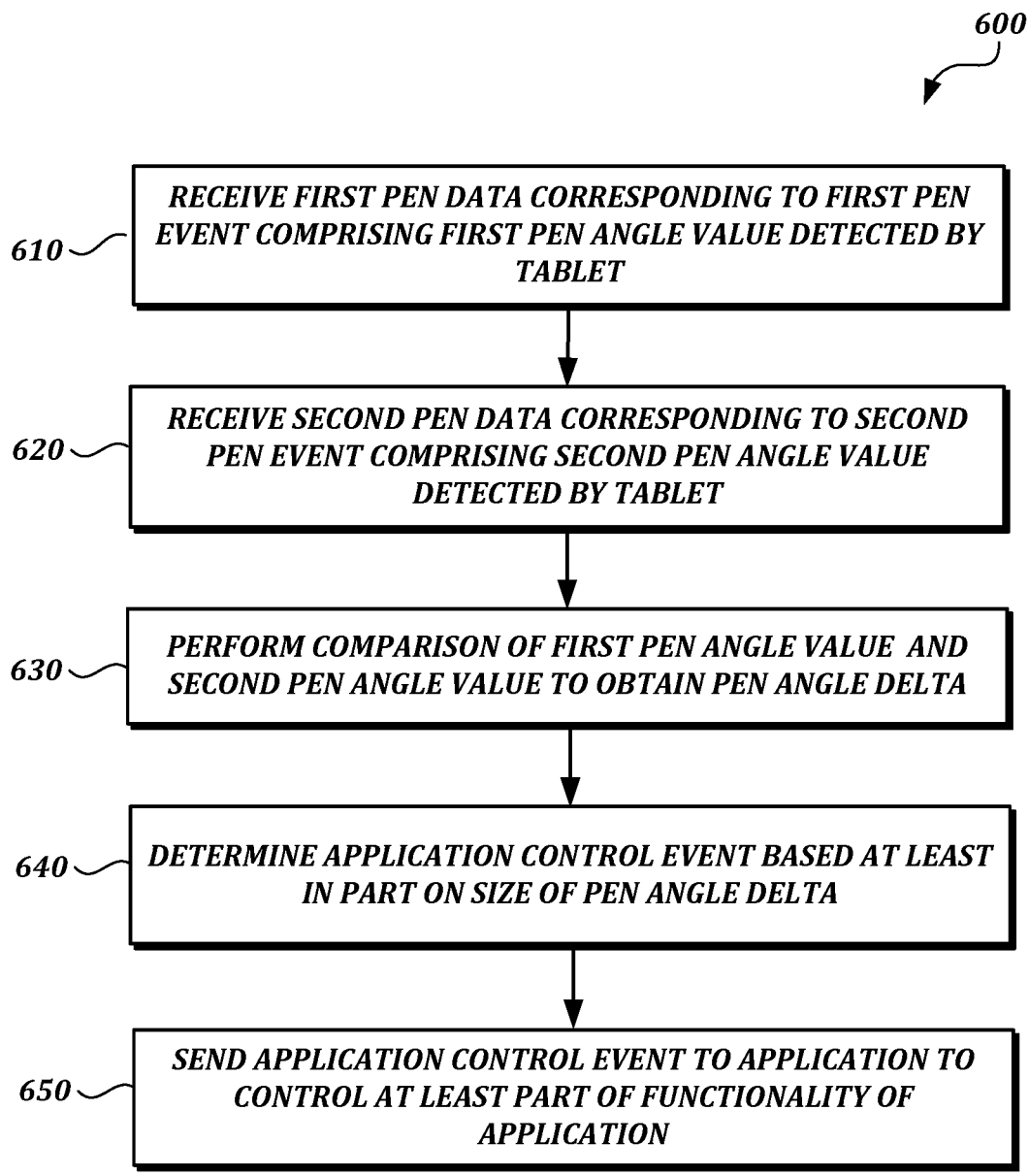

As another alternative, these processes can be modified and/or extended to allow for application control other than rendering of scrolling or other transformations for display. For example, FIG. 6 is a flow diagram of an illustrative process 600 in which application control events are published to an application (e.g., a game, in order to emulate a joystick or similar input device). In the example shown in FIG. 6, at step 610 the system receives the system receives first pen data corresponding to a first pen event comprising a first pen angle (or tilt) value, as detected by an input device such as a tablet input device. (The pen angle value may be sent in pen data packets along with other data such as position data, pressure data, or the like.) At step 620, the system receives second pen data corresponding to a second pen event comprising a second pen angle value, as detected by the input device. At step 630, the system performs a comparison of the first pen angle value and the second pen angle value in order to obtain a pen angle delta. At step 640, the system determines an application control event (e.g., to emulate a joystick) based at least in part on the pen angle delta. For example, in an application where the pen is used to control a camera view or movement of an object, the user may control direction or speed of movement by adjusting the pen orientation to achieve a larger or smaller pen angle delta relative to an original orientation, as appropriate. At step 650, the system sends the transformation events to an application (e.g., a browser, image viewer, map or navigation application, 3D modeling application, or the like executing on a host computing device) to cause the application to render the transformation for display (e.g., on a display of the host computing device, a display of a tablet computing device that includes the input device, on some other display).

As another alternative, although examples described herein indicate that a pen-down status may be required in some situations to control scrolling or other transformations, pen-down status is not necessarily required in all situations. For example, a throw or swipe gesture can be accommodated to assist in traversing content in which additional scrolling events can be published after the pen tip leaves the surface (pen-up status). Such gestures can incorporate inertia modeling as well, with the scrolling speed being reduced gradually after the throw gesture is completed. In one possible scenario, scrolling can be precisely controlled according to techniques described above while the pen is down and pen movement is below a threshold velocity, with control shifting to a throw gesture when pen movement speeds up and exceeds the threshold velocity.

More generally, stages of processes described herein can be separated into additional stages or combined into fewer stages. As another example, processing stages can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Processes that are described as being implemented in software can instead be implemented in hardware, or vice versa.

V. Computing Environment

Embodiments described herein can be implemented by suitably programmed and configured computing devices, individually or in combination. The description below is applicable to computing devices such as servers, personal computers, mobile phones, smart phones, tablet computers, embedded computing devices, handwriting devices, and other currently available or yet to be developed devices that may be used in accordance with embodiments of the present disclosure.

In its most basic configuration, a computing device includes at least one processor and a system memory connected by a communication bus. Depending on the exact configuration and type of device, the system memory may be volatile or nonvolatile memory, such as read only memory ("ROM"), random access memory ("RAM"), EEPROM, flash memory, or other memory technology. Those of ordinary skill in the art and others will recognize that system memory typically stores data and/or program modules that are immediately accessible to and/or currently being operated on by the processor. In this regard, the processor may serve as a computational center of the computing device by supporting the execution of instructions.

The computing device may include a network interface comprising one or more components for communicating with other devices over a network. Embodiments of the present disclosure may access basic services that utilize a network interface to perform communications using common network protocols. The network interface may also include a wireless network interface configured to communicate via one or more wireless communication protocols, such as WiFi, 2G, 3G, 4G, LTE, WiMAX, Bluetooth, and/or the like.

The computing device also may include a storage medium. However, services may be accessed using a computing device that does not include means for persisting data to a local storage medium. Therefore, the storage medium is optional. In any event, the storage medium may be volatile or nonvolatile, removable or non-removable, implemented using any technology capable of storing information such as, but not limited to, a hard drive, solid state drive, CD-ROM, DVD, or other disk storage, magnetic tape, magnetic disk storage, and/or the like.

As used herein, the term "computer readable medium" includes volatile and nonvolatile and removable and non-removable media implemented in any method or technology capable of storing information, such as computer readable instructions, data structures, program modules, or other data. In this regard, system memory and storage media are examples of computer readable media.

For ease of illustration and because it is not important for an understanding of the claimed subject matter, the figures do not show some of the typical components of many computing devices. In this regard, a computing device may include input devices, such as a keyboard, keypad, mouse, trackball, microphone, video camera, touchpad, touchscreen, stylus, and/or the like. Such input devices may be coupled to the computing device by wired or wireless connections including RF, infrared, serial, parallel, Bluetooth, USB, or other suitable connection protocols using wireless or physical connections.

In any of the described examples, data can be captured by input devices (e.g., signature devices) and transmitted or stored for future processing. The processing may include encoding data, which can be subsequently decoded for presentation by output devices. Input devices can be separate from and communicatively coupled to a computing device, or can be integral components of the computing device. The computing device may also include output devices such as a display or touchscreen. The output devices can be separate from and communicatively coupled to the computing device, or can be integral components of the computing device. Input functionality and output functionality may be integrated into the same input/output device (e.g., a touchscreen). Any suitable input device, output device, or combined input/output device either currently known or developed in the future may be used with described systems.

In general, functionality of computing devices described herein may be implemented in computing logic embodied in hardware or software instructions, which can be written in a programming language, such as C, C++, COBOL, JAVA™ PHP, Perl, Python, Ruby, HTML, CSS, JavaScript, VBScript, ASPX, Microsoft .NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub modules. The computing logic can be stored in any type of computer readable medium (e.g., a non-transitory medium such as a memory or storage medium) or computer storage device and be stored on and executed by one or more general purpose or special purpose processors, thus creating a special purpose computing device configured to provide functionality described herein.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure.

The embodiments of the invention in which an exclusive property or privilege is claimed are defined as follows:

1. A computer-implemented method executed by a computing device comprising one or more processors, the computing device being communicatively coupled to a tablet input device, the method comprising:

receiving first pen data corresponding to a first pen event at a first position of a pen device detected by the tablet input device, wherein the first position comprises a first vertical component and a first horizontal component;

receiving second pen data corresponding to a second pen event at a second position of the pen device detected by the tablet input device, wherein the second position comprises a second vertical component and a second horizontal component;

performing a comparison of the first position and the second position to obtain an angle of the second position relative to the first position, and an offset distance between the second position and the first position;

selecting a scrolling direction based at least in part on the angle, wherein the selected scrolling direction is either a vertical direction or a horizontal direction, and wherein the selecting is biased towards scrolling in the vertical direction;

determining a number of first scrolling events based at least in part on the offset distance; and sending the first scrolling events to an application executing on the computing device, wherein the first scrolling events are configured to cause the application to render scrolling in the selected scrolling direction for display.

2. The method of claim 1, wherein the computing device is a host computer, and wherein the steps are performed by a tablet input device driver executing on the host computer.

3. The method of claim 1, wherein the first pen data and the second pen data include an indication of pen-down status.

4. The method of claim 1, wherein the first pen data and the second pen data include an indication of pen button activation.

5. The method of claim 1, wherein selecting the scrolling direction based at least in part on the angle comprises:
   calculating delta Y as the difference between the first and second vertical components;
   calculating delta X as the difference between the first and second horizontal components;
   selecting the vertical scrolling direction if the absolute value of delta Y is greater than or equal to the absolute value of delta X times a slope value, or otherwise selecting the horizontal scrolling direction.

6. The method of claim 1, wherein determining the number of first scrolling events comprises comparing the offset distance with a preselected minimum distance.

7. The method of claim 1, further comprising:
   receiving third pen data corresponding to a third pen event detected by the tablet input device;
   determining whether to continue scrolling in the selected scrolling direction based at least in part on the third pen event;
   determining a number of second scrolling events based at least in part on the third pen event; and
   sending the second scrolling events to the application executing on the computing device.

8. The method of claim 7, wherein the third pen event is at a third position of the pen device detected by the tablet input device that differs from the second position, wherein determining whether to continue scrolling in the selected scrolling direction comprises determining an updated angle based at least in part on the third position, and wherein determining the number of second scrolling events comprises determining an updated offset distance based at least in part on the third position.

9. The method of claim 7, wherein the third pen event is at the same position as the second position, and wherein the number of second scrolling events is the same as the number of first scrolling events.

10. A computing device comprising one or more processors and non-transitory computer-readable media having stored thereon instructions configured to, when executed, cause the computing device to perform steps comprising:
   receiving first pen data corresponding to a first pen event at a first position of a pen device detected by an input device, wherein the first position comprises a first vertical component and a first horizontal component;
   receiving second pen data corresponding to a second pen event at a second position of the pen device detected by the input device, wherein the second position comprises a second vertical component and a second horizontal component;
   performing a comparison of the first position and the second position to obtain an angle of the second position relative to the first position, and an offset distance between the second position and the first position;
   selecting a scrolling direction based at least in part on the angle, wherein the selected scrolling direction is either vertical or horizontal, and wherein the selecting is biased towards vertical scrolling;
   determining a number of first scrolling events based at least in part on the offset distance; and
   sending the first scrolling events to an application executing on the computing device, wherein the first scrolling events are configured to cause the application to render scrolling in the selected scrolling direction for display.

11. The computing device of claim 10, wherein the first pen data and the second pen data include an indication of pen-down status.

12. The computing device of claim 10, wherein the first pen data and the second pen data include an indication of pen button activation.

13. The computing device of claim 10, wherein selecting the scrolling direction based at least in part on the angle comprises:
   calculating delta Y as the difference between the first and second vertical components;
   calculating delta X as the difference between the first and second horizontal components;
   selecting the vertical scrolling direction if the absolute value of delta Y is greater than or equal to the absolute value of delta X times a slope value, or otherwise selecting the horizontal scrolling direction.

14. The computing device of claim 10, wherein determining the number of first scrolling events comprises comparing the offset distance with a preselected minimum distance.

15. The computing device of claim 10, wherein the instructions are further configured to, when executed, cause the computing device to perform further steps comprising:
   receiving third pen data corresponding to a third pen event detected by the input device;
   determining whether to continue scrolling in the selected scrolling direction based at least in part on the third pen event;
   determining a number of second scrolling events based at least in part on the third pen event; and
   sending the second scrolling events to the application executing on the computing device.

16. The computing device of claim 15, wherein the third pen event is at a third position of the pen device detected by the input device that differs from the second position, wherein determining whether to continue scrolling in the selected scrolling direction comprises determining an updated angle based at least in part on the third position, and wherein determining the number of second scrolling events comprises determining an updated offset distance based at least in part on the third position.

17. The computing device of claim 15, wherein the third pen event is at the same position as the second position, and wherein the number of second scrolling events is the same as the number of first scrolling events.

18. A computer-implemented method executed by a computing device comprising one or more processors, the computing device being communicatively coupled to a tablet input device, the method comprising:
   receiving first pen data corresponding to a first pen event at a first position of a pen device detected by the tablet input device;
   receiving second pen data corresponding to a second pen event at a second position of the pen device detected by the tablet input device;
   performing a comparison of the first position and the second position to obtain an offset distance between the second position and the first position;

determining a number of transformation events based at least in part on the offset distance, wherein the transformation events are zoom events or rotation events; and sending the transformation events to an application executing on the computing device, wherein the transformation events are configured to cause the application to render a corresponding transformation for display.

19. A computer-implemented method executed by a computing device comprising one or more processors, the computing device being communicatively coupled to a tablet input device, the method comprising:

receiving first pen data corresponding to a first pen event detected by the tablet input device, wherein the first pen event comprises a first pen angle value;

receiving second pen data corresponding to a second pen event detected by the tablet input device, wherein the second pen event comprises a second pen angle value;

performing a comparison of the first pen angle value and the second pen angle value to obtain a pen angle delta between the second pen angle value and the first pen angle value;

determining an application control event based at least in part on the size of the pen angle delta; and sending the application control event to an application executing on the computing device, wherein the application control event is configured to control at least part of the functionality of the application.

20. The method of claim 19, wherein the application is a game, and wherein the application control event is a game control event.

* * * * *